(12) United States Patent
Fuse

(10) Patent No.: US 6,305,691 B1
(45) Date of Patent: Oct. 23, 2001

(54) SHAFT SEALING APPARATUS

(75) Inventor: Toshihiko Fuse, Sanda (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 08/628,211

(22) Filed: Apr. 5, 1996

(51) Int. Cl.[7] ........................................... F16J 15/40
(52) U.S. Cl. .................. 277/348; 277/387; 277/408
(58) Field of Search .................. 277/348, 358, 277/362, 387, 388, 400, 401, 408, 412, 361

(56) References Cited

U.S. PATENT DOCUMENTS

| | | |
|---|---|---|
| 3,390,496 | 7/1968 | Weiner et al. . |
| 3,496,264 | 2/1970 | Grant . |
| 3,668,183 | 6/1972 | Hoy . |
| 3,737,511 | 6/1973 | Dillon . |
| 3,835,467 * | 9/1974 | Woodman ............................ 341/65 |
| 3,880,434 * | 4/1975 | Echard et al. ...................... 277/348 |
| 4,174,358 * | 11/1979 | Epstein ............................... 525/183 |
| 4,375,532 * | 3/1983 | Baer .................................... 525/310 |
| 4,495,324 * | 1/1985 | Chacko et al. ..................... 524/504 |
| 4,500,955 * | 2/1985 | Chang ................................. 395/775 |
| 4,626,829 * | 12/1986 | Hauck ................................ 382/245 |
| 4,788,249 * | 11/1988 | Maresca et al. ..................... 525/66 |
| 4,847,677 * | 7/1989 | Music et al. ........................ 382/245 |
| 4,853,696 * | 8/1989 | Mukherjee ......................... 382/246 |
| 4,988,764 * | 1/1991 | Nishio et al. ........................ 525/66 |
| 5,120,356 | 6/1992 | Phillips et al. . |
| 5,143,965 * | 9/1992 | Mertz ................................. 524/436 |
| 5,162,422 * | 11/1992 | Lausberg et al. .................. 524/504 |
| 5,187,229 | 2/1993 | Yamamoto et al. . |
| 5,230,950 * | 7/1993 | Kissel ............................ 524/558 X |
| 5,234,993 * | 8/1993 | Huynh-Ba ........................... 525/66 |
| 5,238,253 * | 8/1993 | Sieghartner ....................... 277/408 |
| 5,264,284 * | 11/1993 | Miyata ............................... 428/364 |
| 5,288,799 * | 2/1994 | Schmid et al. ........................ 525/6 |

(List continued on next page.)

FOREIGN PATENT DOCUMENTS

| | | |
|---|---|---|
| A-682 737 | 12/1966 | (BE) . |
| 1 282 540 | 11/1968 | (DE) . |
| 37 33 707 | 4/1989 | (DE) . |
| 0 080 260 | 6/1983 | (EP) . |

(List continued on next page.)

OTHER PUBLICATIONS

Patent Abstracts of Japan; vol.: 18; No.: 317; (M–1622).
Supplementary European Search Report; Application No. EP 93 91 0345; Dated Aug. 29, 1995 listing above cited references.

(List continued on next page.)

*Primary Examiner*—Anthony Knight
(74) *Attorney, Agent, or Firm*—Armstrong, Westerman, Hattori, McLeland & Naughton, LLP.

(57) ABSTRACT

A shaft sealing apparatus capable of preventing gases vaporized from a gas seal or purge fluid from leaking outside before a pressure switch operates due to a pressure rise resulting from a fluid leakage from a mechanical seal. The apparatus comprises a seal casing and a rotary shaft passing through the former and having a mechanical seal A and a dry gas seal B mounted thereon in line with each other to provide purge fluid areas C therebetween. With this arrangement, a purge fluid is supplied to one of the purge fluid areas through a supply line having an orifice $O_A$ and the supplied purge fluid and a leaked part of a target fluid to be sealed are released outside from the other purge fluid area through a relief line having an orifice $O_B$. The relief line is provided with a bypass line with an electromagnetic valve and a pressure switch and bypassing the orifice $O_B$. In this case, the purge fluid supply pressure $P_1$, the preset pressure $P_2$ between the orifices $O_A$ and $O_B$, the pressure $P_3$ in the area from the orifice $O_B$ to outside and the pressure switch operating pressure $P_S$ satisfy the relationships of $P_1 > P_S > P_2 > P_3$.

4 Claims, 2 Drawing Sheets

U.S. PATENT DOCUMENTS

| | | |
|---|---|---|
| 5,330,694 | 7/1994 | Iwaya . |
| 5,331,489 * | 7/1994 | Johnson et al. .................. 360/104 |
| 5,344,636 * | 9/1994 | Miyata ............................. 423/593 |
| 5,381,288 * | 1/1995 | Karam, II ......................... 360/104 |
| 5,401,442 * | 3/1995 | Miyata ............................. 252/609 |
| 5,412,977 * | 5/1995 | Schmohl et al. .................... 73/46 |
| 5,421,593 * | 6/1995 | Aritsubo et al. .................. 277/361 |
| 5,489,648 * | 2/1996 | Okimura et al. .................... 525/71 |
| 5,498,007 * | 3/1996 | Kulkarni et al. ................... 277/400 |

FOREIGN PATENT DOCUMENTS

| | | |
|---|---|---|
| A-0 199 087 | 10/1986 | (EP) . |
| A-0 276 655 | 8/1988 | (EP) . |
| A-0 358 358 | 3/1990 | (EP) . |
| A-0 410 925 | 1/1991 | (EP) . |
| 0 517 448 A1 | 9/1992 | (EP) . |
| 0 498 566 A1 | 12/1992 | (EP) . |
| 0 544 502 A1 | 2/1993 | (EP) . |
| A-0 555 774 A1 | 8/1993 | (EP) . |
| 0 594 303 | 4/1994 | (EP) . |
| 2 684 926 | 6/1993 | (FR) . |
| 64-51458 | 2/1964 | (JP) . |
| 42-12546 | 7/1967 | (JP) . |
| 45-30945 | 10/1970 | (JP) . |
| 54-123158 | 9/1979 | (JP) . |
| 55-9661 | 1/1980 | (JP) . |
| 55-44108 | 11/1980 | (JP) . |
| 56-9943 | 3/1981 | (JP) . |
| 57-8246 | 1/1982 | (JP) . |
| 59-60761 * | 4/1984 | (JP) ................................. 360/104 |
| 59-149940 | 8/1984 | (JP) . |
| 59-232135 | 12/1984 | (JP) . |
| 60-110740 | 6/1985 | (JP) . |
| 60-118735 | 6/1985 | (JP) . |
| 60-262853 | 12/1985 | (JP) . |
| 62-13379 | 3/1987 | (JP) . |
| 62-223250 | 10/1987 | (JP) . |
| 62-223251 | 10/1987 | (JP) . |
| 63-53218 | 10/1988 | (JP) . |
| 63239649 * | 10/1988 | (JP) ................................. 360/104 |
| 64-421 | 1/1989 | (JP) . |
| 64-87652 | 3/1989 | (JP) . |
| 1-146942 | 6/1989 | (JP) . |
| 2-42109 | 9/1990 | (JP) . |
| 2-42379 | 9/1990 | (JP) . |
| 3-109452 | 4/1991 | (JP) . |
| 3-91560 | 4/1991 | (JP) . |
| 3-115342 | 5/1991 | (JP) . |
| 3-146552 | 6/1991 | (JP) . |
| 3-207735 | 9/1991 | (JP) . |
| 5-8939 | 2/1993 | (JP) . |
| 5-253909 | 5/1993 | (JP) . |
| 5-70669 | 10/1993 | (JP) . |

OTHER PUBLICATIONS

Patent Abstracts of Japan, vol. 95, No. 003; JP–A–07 061 812 (Abstract).

Database WPI, Section Ch, Week 9013, Derwent Publications, Class A82, AN 90095409 & JP A 2 047 171.

* cited by examiner

SHAFT SEALING APPARATUS

BACKGROUND OF THE INVENTION

1. Field of the Invention

The present invention relates to a shaft sealing apparatus for various kinds of pumps handling various low boiling point inflammable fluids such as butane, methane, ethane, propane, LNG (Liquefied Natural Gas) and etc.

2. Prior Art

Conventionally, in the case of pumps handling low boiling point and highly inflammable fluids such as butane, methane, ethane, propane, LNG and etc., it has been usual that a reservoir L is used so as to store and supply or pressure-supply a buffer solution or a sealing solution used for the mechanical seal M of a shaft sealing apparatus whereby a fluid leaking from the contact type seal is released outside (for example, into the flare) instead of being introduced into the atmosphere.

Further, there has been used a shaft sealing apparatus as described in Japanese Unexamined Patent Publication H6-42650 which has a favorable and stabilized sealing function in a high-pressure condition or with respect to a volatile or low boiling point fluid such as liquid ammonium.

However, the above-mentioned conventional shaft sealing apparatuses have had the following various problems. That is, where the above-mentioned reservoir L is used, the entire apparatus becomes large-sized or the manufacturing cost increases.

Further, since the gas in the purge fluid area flows into the reservoir L without any resistance, where a high-pressure sealing fluid leaks from the mechanical seal, the pressure of the purge gas as a sealing fluid for a dry gas seal (i.e., non-contact type mechanical seal) drastically changes in such a manner that it rises up immediately and then drops at once failing to enable a stable dry gas sealing operation to be carried out.

Moreover, where the purge gas discharge line is directly coupled to the flare, since harmful gases from other various facilities of the plant gather in the flare, there is a danger of the harmful gases concentrated into the flare entering into the shaft sealing apparatus. Therefore, when these harmful gases enter into the purge gas area of the sealing apparatus, they tend to leak from the sealing surface of the dry gas seal toward the atmosphere.

In addition, where the high-pressure sealing fluid leaks from the mechanical seal, the pressure of the purge gas as a sealing fluid of the dry gas seal immediately rises up so that the sealing fluid penetrates near the sealing surface of the dry gas seal. As the sealing fluid used in the sealing apparatus is highly inflammable and the dry gas seal also allows a small quantity of purge gas to leak, there is a danger of gas explosion at the bearings or drive device outside the sealing apparatus.

Lastly, in the case of the latter (i.e., the shaft sealing apparatus described in Japanese Unexamined Patent Publication No. H6-42650), since it lacks a purge gas supply system, the density of the sealing gas leaked into the purge fluid area becomes high so that the leakage of the high-density sealing gas into the atmosphere can not be prevented.

SUMMARY OF THE INVENTION

The present invention has been developed in order to solve the above-described problems and an object of the invention is to provide a shaft sealing apparatus which is capable of preventing vaporized gases from the gas seal or purge fluids from leaking into the atmosphere until the pressure switch operates due to a pressure rise resulting from the leakage of the gases from the mechanical seal of the apparatus.

To achieve the above object, the shaft sealing apparatus of the present invention is characterized in the following points.

According to a first aspect of the invention, the shaft sealing apparatus comprises a seal casing and a rotary shaft passing through the former wherein a mechanical seal and a dry gas seal are mounted on the rotary shaft in line with each other so as to seal a target sealing fluid area from the atmosphere through two purge fluid areas formed between both of the seals. With this structure, a purge fluid from an external supply line is supplied to one of the purge fluid areas adjacent to the sealing surface of the dry gas seal and is released outside from the other purge fluid area adjacent to a spring retainer of the dry gas seal through a relief line having an orifice.

According to a second aspect of the invention, the shaft sealing apparatus comprises a seal casing and a rotary shaft passing through the former wherein a mechanical seal and a dry gas seal are mounted on the rotary shaft in line with each other so as to seal a target sealing fluid area from the atmosphere through two purge fluid areas formed between both of the seals. Further, a non-contact seal section is provided so as to establish communication between the purge fluid area adjacent to the seal surface of the dry gas seal and the purge fluid area adjacent to a spring retainer of the dry gas seal and a purge fluid from outside is supplied to the dry gas seal side purge fluid area through a supply line having an orifice and the supplied purge fluid is then released outside from the purge fluid area adjacent to the spring retainer of the dry gas seal through a relief line.

According to a third aspect of the invention, in association with the first aspect of the invention, the purge fluid is supplied to the dry gas seal surface side purge fluid area from the supply line having the orifice.

According to a fourth aspect of the invention, in association with the first, second and third aspects of the invention, a bypass line having an electromagnetic valve and a pressure switch is provided on the purge fluid relief line so as to bypass the orifice of the latter.

According to a fifth aspect of the invention, in association with the fourth aspect of the invention, when it is assumed that the supply pressure of the purge fluid be $P_2$, the preset pressure of a seal section including the purge fluid areas between both of the orifices be $P_2$, the pressure of the area between the orifice of the relief line and outside be $P_3$ and the operating pressure of the pressure switch be $P_s$, the relationships of $P_1 > P_s > P_2 > P_3$ are established.

As the non-contact seal section with respect to the rotary shaft, a labyrinth seal, liner seal or liner ring (such as a carbon bush fixed to the seal casing) may be used. These non-contact seal sections can not completely prevent the flow of the purge fluid but allow for the passage of the purge fluid and make it difficult to transmit a pressure change in one area to the other area.

The shaft sealing apparatus according to the first aspect of the present invention make it possible to reduce the rapid pressure fluctuation width of the purge fluid area (i.e., the sealing fluid area of the dry gas seal) and enable the dry gas seal to be operated in a stable manner by the provision of an orifice in the purge fluid relief line. Further, it prevents the pressure fluctuation of the flare from being transmitted thereto to thereby prevent the entry of harmful gases from the flare thereinto.

The shaft sealing apparatus according to the second aspect of the present invention has a structure such that the purge fluid supply line is provided with an orifice and the non-contact seal section which allows the passage of the purge fluid between purge fluid area adjacent to the sealing surface of the dry gas seal and the purge fluid area adjacent to the spring retainer (i.e., the mechanical seal side) of the dry gas seal so that even when the sealing fluid leaks from the mechanical seal, it is possible to reduce the pressure fluctuation width of the purge fluid area on the dry gas seal surface side and to prevent purge gases containing the leaking fluid from coming close to the sealing surface of the dry gas seal. Consequently, the dry gas seal can be operated in a stable manner and to prevent the leakage of harmful gases from the sealing surface of the dry gas seal.

The shaft sealing apparatus according to the third aspect of the present invention can further reduce the pressure fluctuation of the purge fluid area even when the sealing fluid leaks since, due to a synergetic effect by the first aspect of the present invention, the purge fluid areas are partitioned by two orifices.

The shaft sealing apparatus according to the fourth aspect of the present invention has the structure such that the pressure fluctuation in the purge fluid areas is detected by the pressure sensor and the bypass line of the purge fluid discharge line is opened and closed by the electromagnetic valve operated by the pressure switch so that even when the sealing fluid leaks from the mechanical seal, the purge fluid containing such leaking fluid can be quickly introduced into the discharge line thereby discharging the purge fluid outside the apparatus. Further, the pressure of the purge fluid areas can be stabilized.

The shaft sealing apparatus according to the fifth aspect of the present invention has the structure such that the pressure $P_2$ of the purge fluid area between the dry gas seal and the mechanical seal is always lower than the purge fluid supply pressure $P_1$ ($P_1>P_2$) and the operating pressure Ps of the pressure switch PS can be set to an upper limit value of the interseal pressure $P_2$ so that even when there is a pressure rise due to the vaporized part of the leaking fluid at the normal operation or due to a large amount of leaking fluid in an emergency, the purge fluid from outside is always supplied to the dry gas seal side purge fluid area to prevent the leaking fluid or vaporized gas from reaching the dry gas seal side so that it is possible to prevent the leaking fluid or the vaporized gas from flowing into the atmosphere.

PREFERRED EMBODIMENT OF THE INVENTION

The preferred embodiment of the present invention will now be described with reference to the accompanying drawings.

Figure 1:
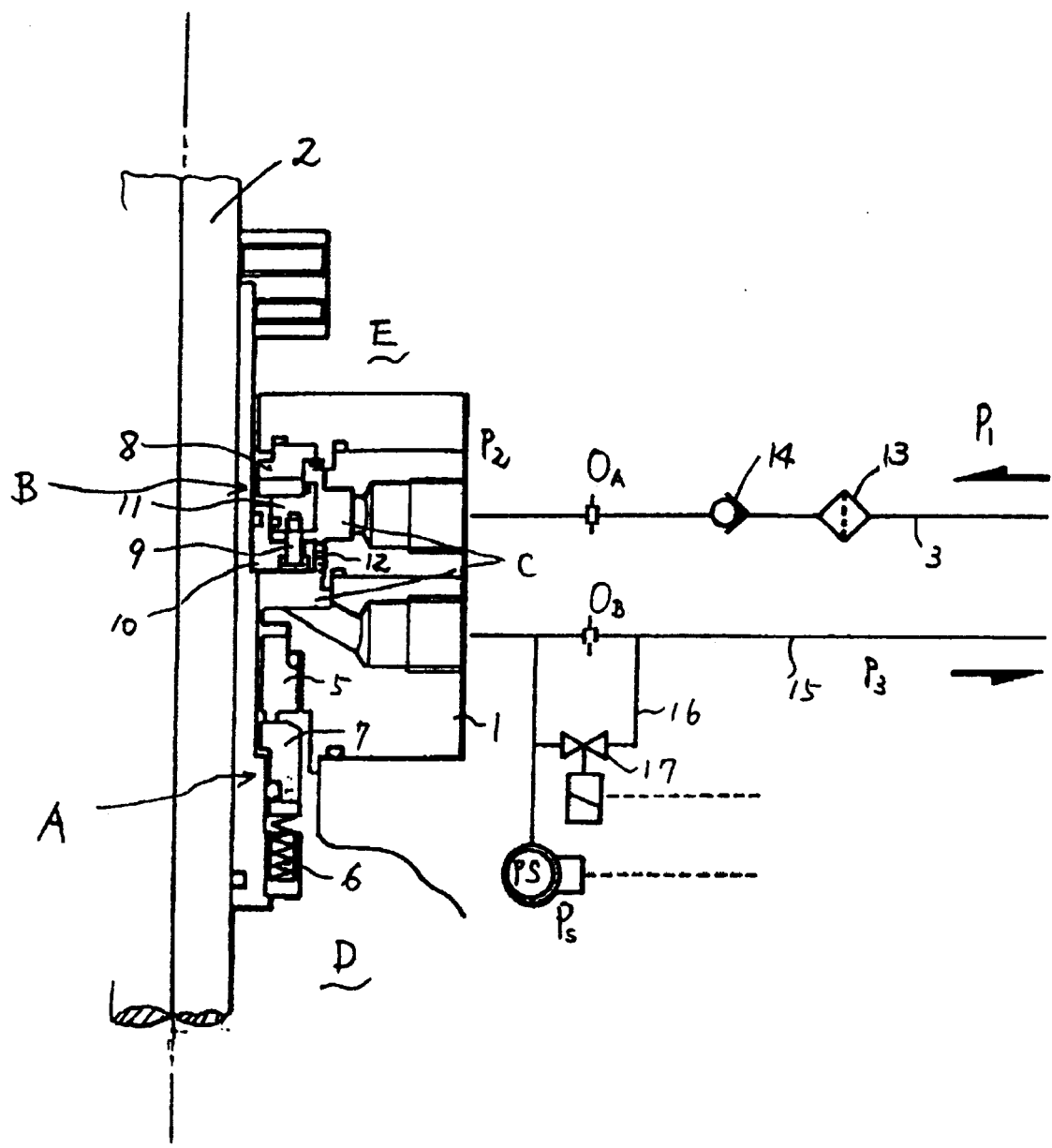
FIG. 1 is a system diagram of a shaft sealing apparatus according to one embodiment of the present invention.
Figure 2:
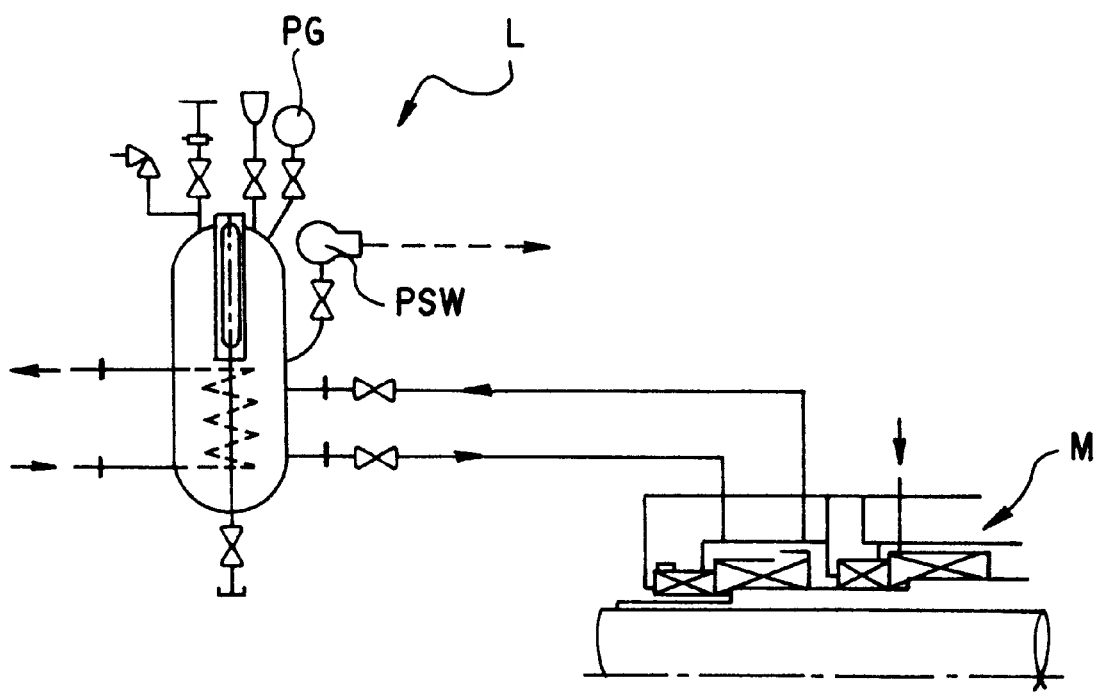
FIG. 2 is a system diagram of one example of a conventional shaft sealing apparatus using a reservoir.

FIG. 1 is a system diagram of a shaft sealing apparatus according to one embodiment of the present invention wherein reference numeral 1 designates a seal casing and reference numeral 2 designates a rotary shaft passing through the seal casing 1. Further, as shown in FIG. 1, a contact type mechanical seal A and a dry gas seal (i.e., non-contact type mechanical seal) B are mounted on the rotary shaft 2 in line with each other with the mechanical seal A located on the side of a target sealing fluid area D and the dry gas seal B located on the side of an atmospheric area E.

The mechanical seal A fixedly holds a stationary sealing ring 5 on the seal casing 1 and at the same time, allows a rotary sealing ring 7 to be biased by sping bias force 6 toward the stationary sealing ring 5 to be slidably held on the rotary shaft 2 in the axial direction.

Further, the dry gas seal B fixedly holds a stationary sealing ring 8 on the seal casing 1 and at the same time, allows a rotary sealing ring 11 which is pressed against the stationary sealing ring 8 through a drive pin 9, and a spring retainer 10 to be slidably held on the rotary shaft 2 in the axial direction. In this case, the term "dry gas seal" used herein means a sealing device which is provided with a stationary sealing ring and a rotary sealing ring either one of which has a dynamic pressure generating groove, and which is operated by keeping the sealing surfaces thereof held out of contact with each other.

Between the above-mentioned contact type mechanical seal A and the dry gas seal B there are formed purge fluid areas C and a labyrinth seal 12 is provided in one of the purge fluid areas C located on the side of the sealing surface of the dry gas seal B whereby a leaking part of the target fluid to be sealed is prevented from being mixed with a purge fluid such as nitrogen gas and reaching the dry gas seal B.

In the above-mentioned purge fluid area C on the side of the sealing surface of the dry gas seal B there is provided a supply line 3 for supplying from outside an inert gas such as nitrogen gas and a purge fluid such as water, oil or the like. The purge fluid supply line 3 is provided with a filter 13, a check valve 14 and an orifice $O_A$.

Further, in the purge fluid area C located on the side of the contact type mechanical seal A there is connected a relief line 15 for discharging a leaking fluid. This relief line is provided with an orifice $O_B$ and a bypass line 16 attached with an electromagnetic valve 17 and a pressure switch PS is provided so as to bypass the orifice $O_B$.

With the above structure, a purge fluid such as nitrogen gas is supplied to the purge fluid area C on the dry gas seal side through the filter 13, the check valve 14 and the orifice $O_A$ and the supplied purge fluid is then released into a line for burning a high pressure gas, a poisonous gas and etc., from the mechanical seal A side purge fluid area C through the orifice $O_B$.

Further, the purge fluid supply pressure $P_1$, the pressure $P_2$ of the seal section which is the purge fluid areas C preestablished between the two orifices $O_A$ and $O_B$, the pressure $P_3$ generating from the orifice $O_B$ to the flare and the operating pressure Ps of the pressure switch satisfy the relationships of $P_1>Ps>P_2>P_3$. In the instant embodiment, all of these pressures are set to the following values, respectively. That is, $P_1$: 2 kg f/cm$^2$G, $P_2$: about 1 kg f/cm$^2$G, $P_3$ : atmospheric pressure—0.3 kg f/cm$^2$G and Ps:1.5 kg f/cm$^2$G.

In the case of the shaft sealing apparatus having the above-described structure, the purge fluid (and leaking target sealing fluid) are normally caused to flow into the flare through the orifices $O_A$ and $O_B$ by closing the electromagnetic valve 17. Further, when a large Quantity of the target sealing fluid leaks from the mechanical seal A, the pressure switch PS operates to open the electromagnetic valve 17 and release the purge fluid and the leaking target sealing fluid into a line flare through the bypass line 16.

For example, even when the preset pressure of the seal section between the orifices $O_A$ and $O_B$ rises up to the set pressure Ps (1.5 kg f/cm$^2$G) of the pressure switch PS, the flow of the purge fluid (due to the leaking target sealing fluid) does not change so that the dry gas seal B can be kept under a purge fluid atmosphere.

By the way, it is preferable to use an inert gas for a purge fluid (gas).

As described above, the shaft sealing apparatus according to the present invention has the following various advantages.

Firstly, since the purge fluid relief line is provided with an orifice, it is possible to reduce the width of rapid pressure fluctuation in the purge fluid areas thereby enabling the dry gas seal to be operated in a stable manner. Further, the pressure fluctuation in the flare is hardly transmitted to the shaft sealing apparatus and the entry of harmful gases from the flare into the apparatus is prevented. (The first aspect of the invention).

Secondly, since the purge fluid supply line is provided with an orifice and since the non-contact seal section is provided for the passage of the purge fluid between the purge fluid area on the side of the sealing surface of the dry gas seal and the purge fluid area on the side of the spring retainer of the dry gas seal (on the side of the contact type mechanical seal), even when the sealing fluid. leaks from the spring retainer side of the dry gas seal, it is possible to reduce the width of pressure fluctuation in the purge fluid area on the side of the sealing surface of the dry gas seal and it is also possible to prevent the purge gases containing a leaking part of the purge fluid from coming close to the sealing surface of the dry gas seal. Therefore, the dry gas seal can be operated in a stable manner and the leakage of harmful gases from the sealing surface of the dry gas seal can be prenented. (The second aspect of the invention).

Since the purge fluid supply line is provided with an orifice which results in dividing the purge fluid area by the two orifices, even when the target sealing fluid leaks, the pressure fluctuations in the purge fluid areas can be further reduced. (The third aspect of the invention).

A bypass line attached with an electromagnetic valve and a pressure switch and communicating with the relief line is provided so as to bypass the orifice of the relief line. Therefore, by opening and closing the bypass line according to necessity, even when the sealing fluid leaks from the spring retainer side (the contact type mechanical seal side) of the dry gas seal, it is possible to quickly introduce the purge fluid containing the leaking fluid into the discharge line to thereby discharge the fluid outside the shaft sealing apparatus.

(The fourth aspect of the invention).

Lastly, the purge fluid supply pressure $P_1$, the pressure $P_2$ of the seal section covering the purge fluid areas between the orifices of both the supply line and the relief line, the pressure $P_3$ generating from the orifice of the relief line to outside and the operating pressure Ps of the pressure switch are so set as to satisfy the relationships of $P_1>Ps>P_2>P_3$ so that the purge fluid is always supplied to the dry gas seal and even when the target fluid to be sealed leaks, the leaking part of the fluid is prevented from reaching the dry gas seal thereby preventing the leaked part of the target fluid flowing into the atmosphere. (The fifth aspect of the invention).

The above mentioned mechanical seal A has been described as a contact type mechanical type seal, however the same effect could be obtained by replacing with non-contact type mechanical seal.

What is claimed is:

1. A shaft sealing apparatus comprising a seal casing and a rotary shaft passing through the seal casing and having a mechanical seal and a dry gas seal mounted thereon in line with each other so as to seal a target sealing fluid area from an atmospheric area through a first and a second purge fluid area formed between said both seals with said first purge fluid area being located adjacent a sealing surface of said dry gas seal and said second purge fluid area being located adjacent a spring retainer side of said dry gas seal, wherein a purge fluid is supplied from an external supply line into said first purge fluid area and the supplied purge fluid is then released outside the apparatus from said purge fluid area through a relief line, wherein said dry gas seal includes a stationary-side seal ling and a rotation-side seal ring, either one of the rings includes a dynamic pressure-producing groove, said dry gas seal is driven in a state in which said dry gas seal faces are not in contact with each other, and the relief line is provided with an orifice, wherein a bypass line provided with an electromagnetic valve and a pressure switch is attached to said relief line so as to communicate with the latter and so as to bypass an orifice of said relief line, wherein said bypass line is for bypassing an orifice on the relief line, and the bypass line is provided with an electromagnetic valve and a pressure switch.

2. A shaft sealing apparatus comprising a seal casing and a rotary shaft passing through the seal casing and having a mechanical seal and a dry gas seal mounted thereon in line with each other whereby a target fluid area is sealably shielded from an atmospheric area through a first and a second purge fluid area formed between said both seals, with said first purge fluid area being located adjacent a sealing surface of said dry gas seal and said second purge fluid area being located adjacent a spring retainer side, wherein a non-contact type seal is provided to establish communication between said first and second purge fluid areas and wherein a purge fluid from outside is supplied to said first purge fluid area through a supply line provided with an orifice and the supplied purge fluid is then released outside from said second purge fluid area through a relief line, wherein said dry gas seal includes a stationary-side seal ring and a rotation-side seal ring, either one of the rings includes a dynamic pressure-producing groove, said dry gas seal is driven in a state in which said dry gas seal faces are not in contact with each other, a the relief line is provided with an orifice, and said first purge fluid area has a non-contact seal portion, wherein a bypass line provided with an electromagnetic valve and a pressure switch is attached to said relief line so as to communicate with the latter and so as to bypass an orifice of said reliefline, wherein said bypass line is for bypassing an orifice on the relief line, and the bypass line is provided with an electromagnetic valve and a pressure switch.

3. A shaft sealing apparatus according to claim 1, wherein said purge fluid is supplied from outside to said first purge fluid area through a supply line provided with an orifice, wherein said supply line includes an orifice.

4. A shaft sealing apparatus according to claims 1 or 2, wherein a purged fluid supply pressure is $P_1$, a present pressure of a seal section covering said first and second purge fluid areas between both orifices is $P_2$, a pressure generating in an area from the orifice of said relief line to the outside is $P_3$ and an operating pressure of said pressure switch is Ps and a relationship of $P_1>Ps>P_2>P_3$ is satisfied.

* * * * *